United States Patent [19]

Zeidler

[11] 4,423,287

[45] Dec. 27, 1983

[54] END-TO-END ENCRYPTION SYSTEM AND METHOD OF OPERATION

[75] Inventor: Howard M. Zeidler, Palo Alto, Calif.

[73] Assignee: VISA U.S.A., Inc., San Francisco, Calif.

[21] Appl. No.: 278,001

[22] Filed: Jun. 26, 1981

[51] Int. Cl.³ .............................................. H04L 9/00
[52] U.S. Cl. .............................. 178/22.08; 340/825.34; 235/379; 235/382
[58] Field of Search ................ 375/2.1, 2; 178/22.01, 178/22.09, 22.16, 22.13, 22.08; 340/825.34; 235/379, 382, 380

[56] References Cited

U.S. PATENT DOCUMENTS

| 3,956,615 | 5/1966 | Anderson et al. | 178/22.09 |
|---|---|---|---|
| 4,115,657 | 9/1978 | Morgan | 178/22.16 |
| 4,160,120 | 7/1979 | Barnes et al. | 178/22.09 |
| 4,182,933 | 1/1980 | Rosenblum | 375/2.1 |
| 4,193,131 | 3/1980 | Lennon et al. | 178/22.09 |
| 4,200,770 | 4/1980 | Hellman et al. | 178/22.13 |
| 4,203,166 | 5/1980 | Ehrsam et al. | 375/2 |
| 4,218,738 | 8/1980 | Matyas et al. | 178/22.08 |
| 4,223,403 | 9/1980 | Konheim et al. | 178/22.09 |
| 4,227,253 | 10/1980 | Ehrsam et al. | 178/22.01 |
| 4,259,720 | 3/1981 | Campbell | 375/2 |
| 4,268,715 | 5/1981 | Atalla | 340/825.34 |
| 4,281,215 | 7/1981 | Atalla | 340/825.34 |
| 4,283,599 | 8/1981 | Atalla | 340/825.34 |
| 4,317,957 | 3/1982 | Sendrow | 178/22.08 |
| 4,376,279 | 3/1983 | Perlman et al. | 340/825.34 |
| 4,386,233 | 5/1983 | Smid et al. | 178/22.08 |

FOREIGN PATENT DOCUMENTS

WO81/00135  9/1981  PCT Int'l Appl. ................. 375/2

Primary Examiner—Sal Cangialosi
Attorney, Agent, or Firm—Limbach, Limbach & Sutton

[57] ABSTRACT

An efficient end-to-end encryption system including key management procedures for providing secure, financial data communication between a system user at one of a plurality of transaction terminals of one of a plurality of acquirer institutions and one of a plurality of issuer institutions, with selected elements of the data being encrypted, decrypted, and processed using a one time session key which is similarly encrypted with master keys and efficiently sent along with the specific segments of the request and response messages.

12 Claims, 14 Drawing Figures

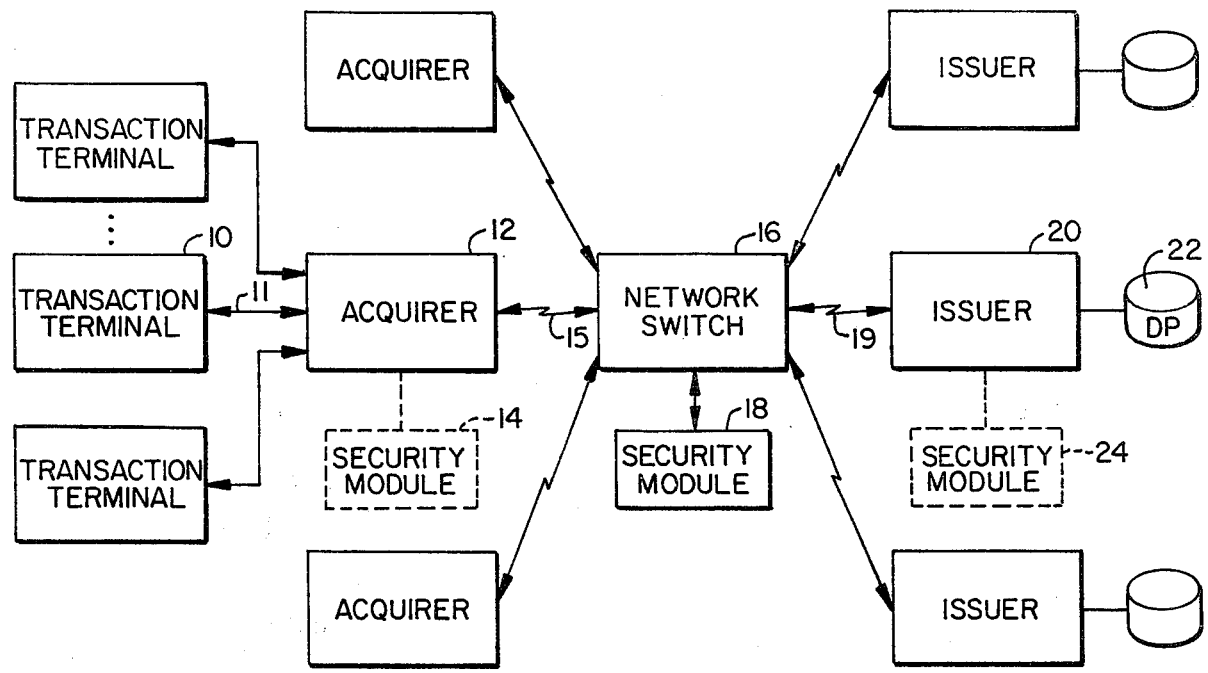
FIG._1.
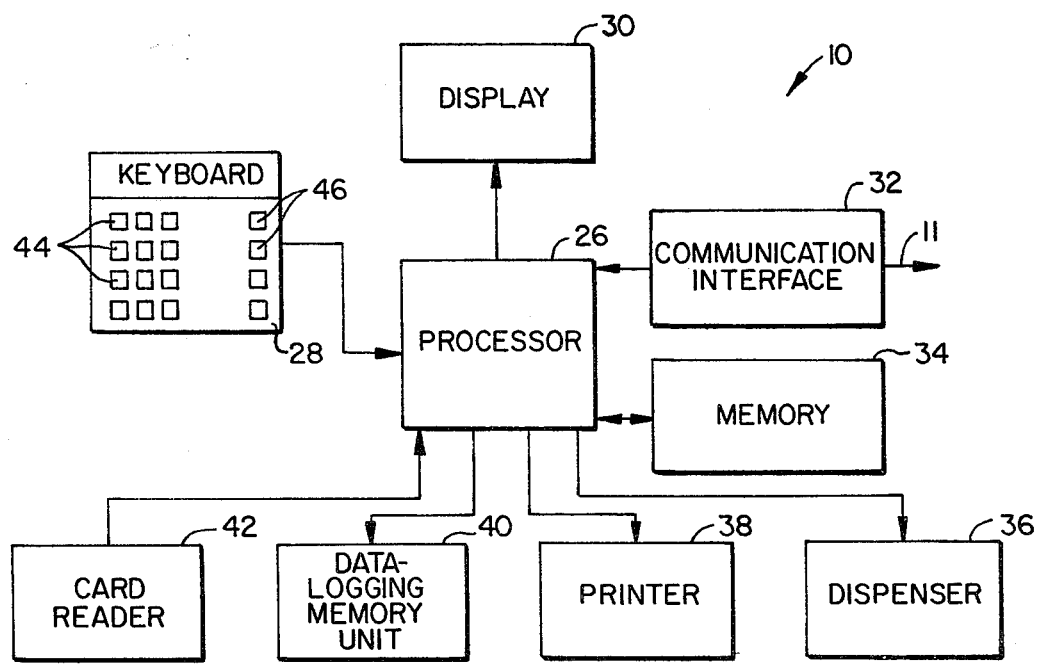
FIG._2.

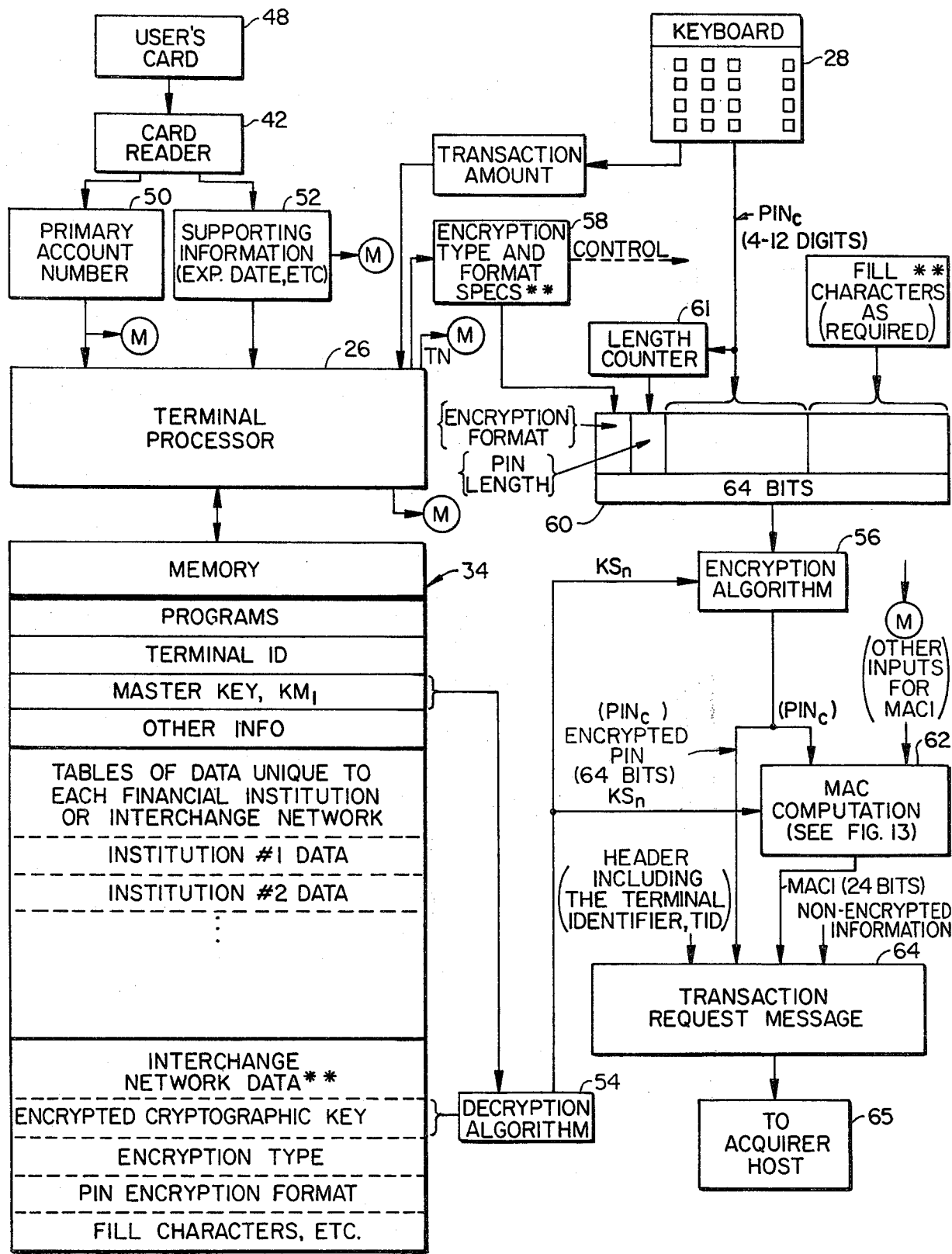
FIG._3.

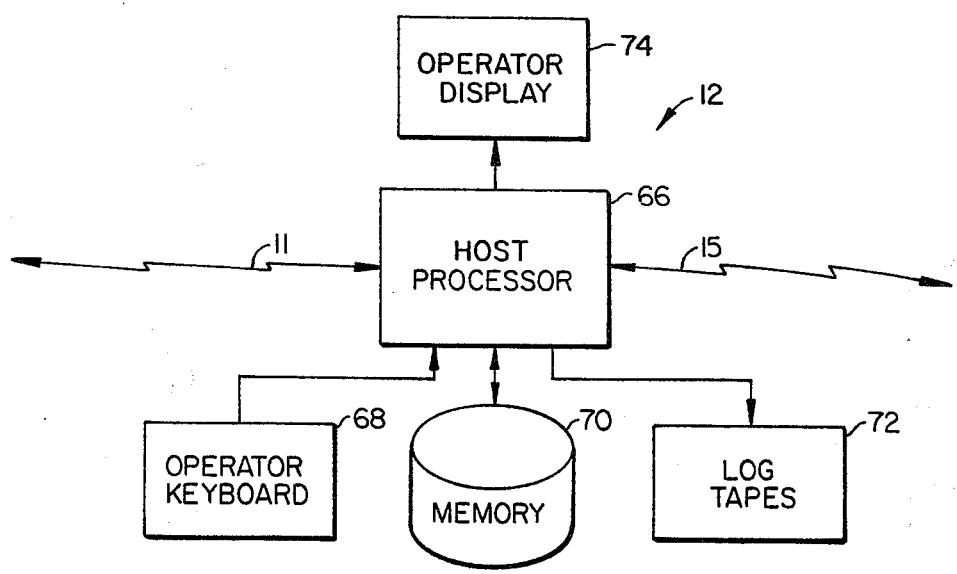
FIG._4.
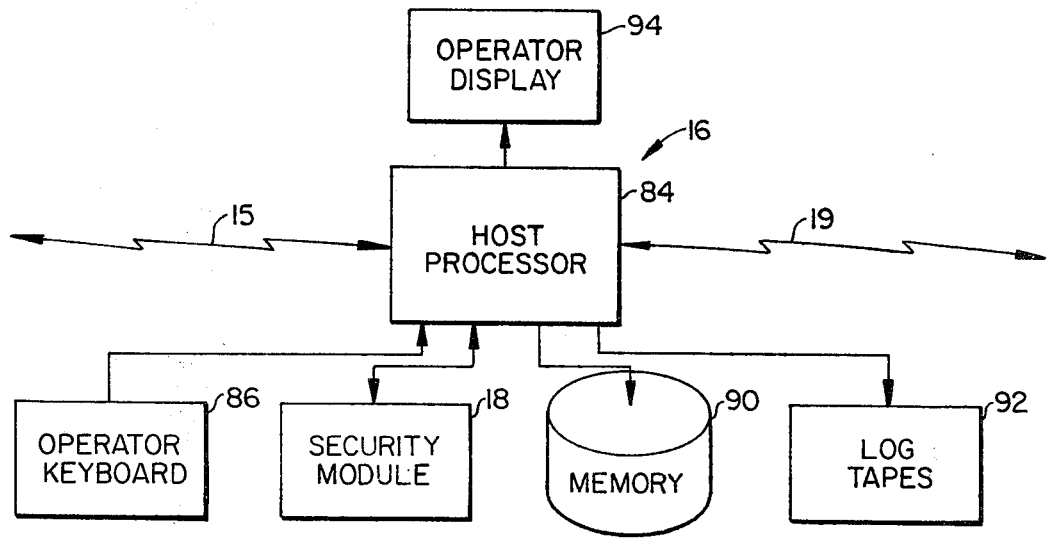
FIG._6.
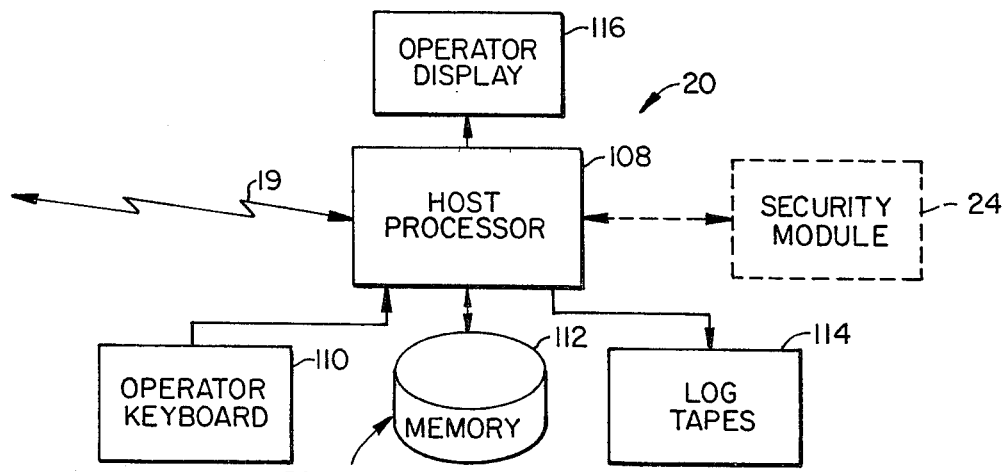
FIG._8. FOR FILES OF CARDHOLDER PINS (ENCRYPTED WITH DATA BASE KEY), FOR BUSINESS-DECISION ACCOUNT INFORMATION, GENERAL DATA, PROGRAMS, ACTIVITY FILES, ETC.

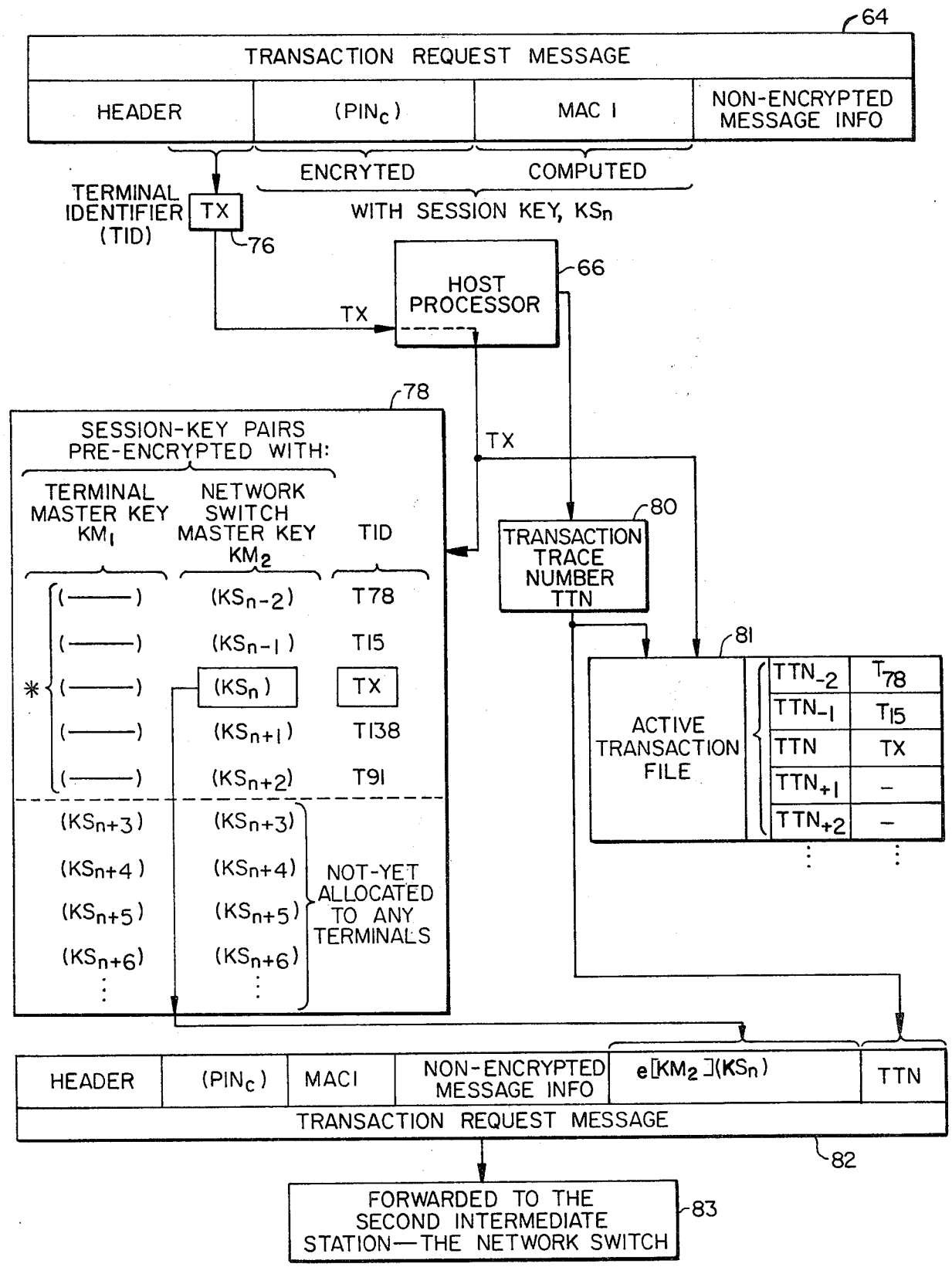
FIG._5.

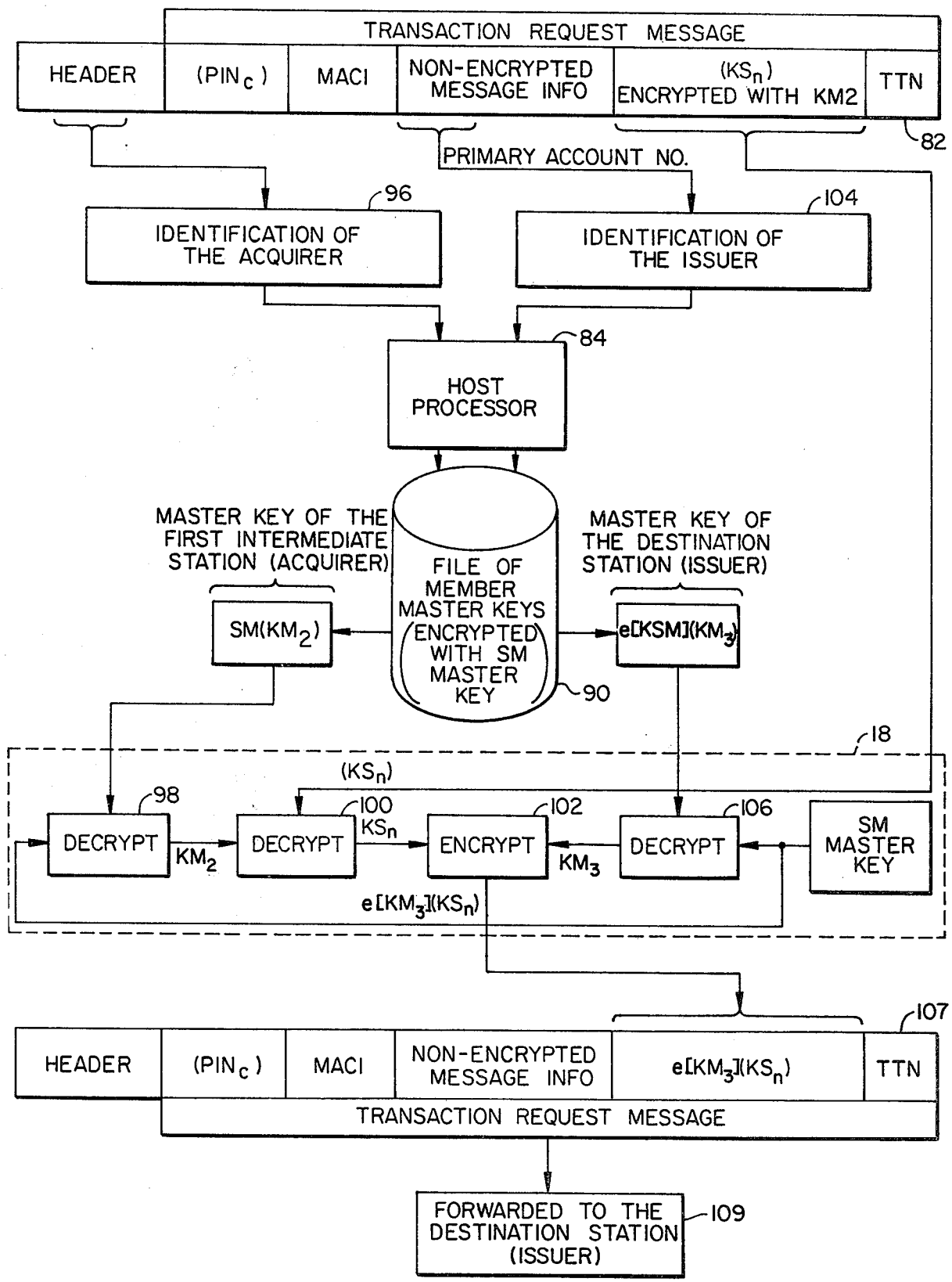
FIG._7.

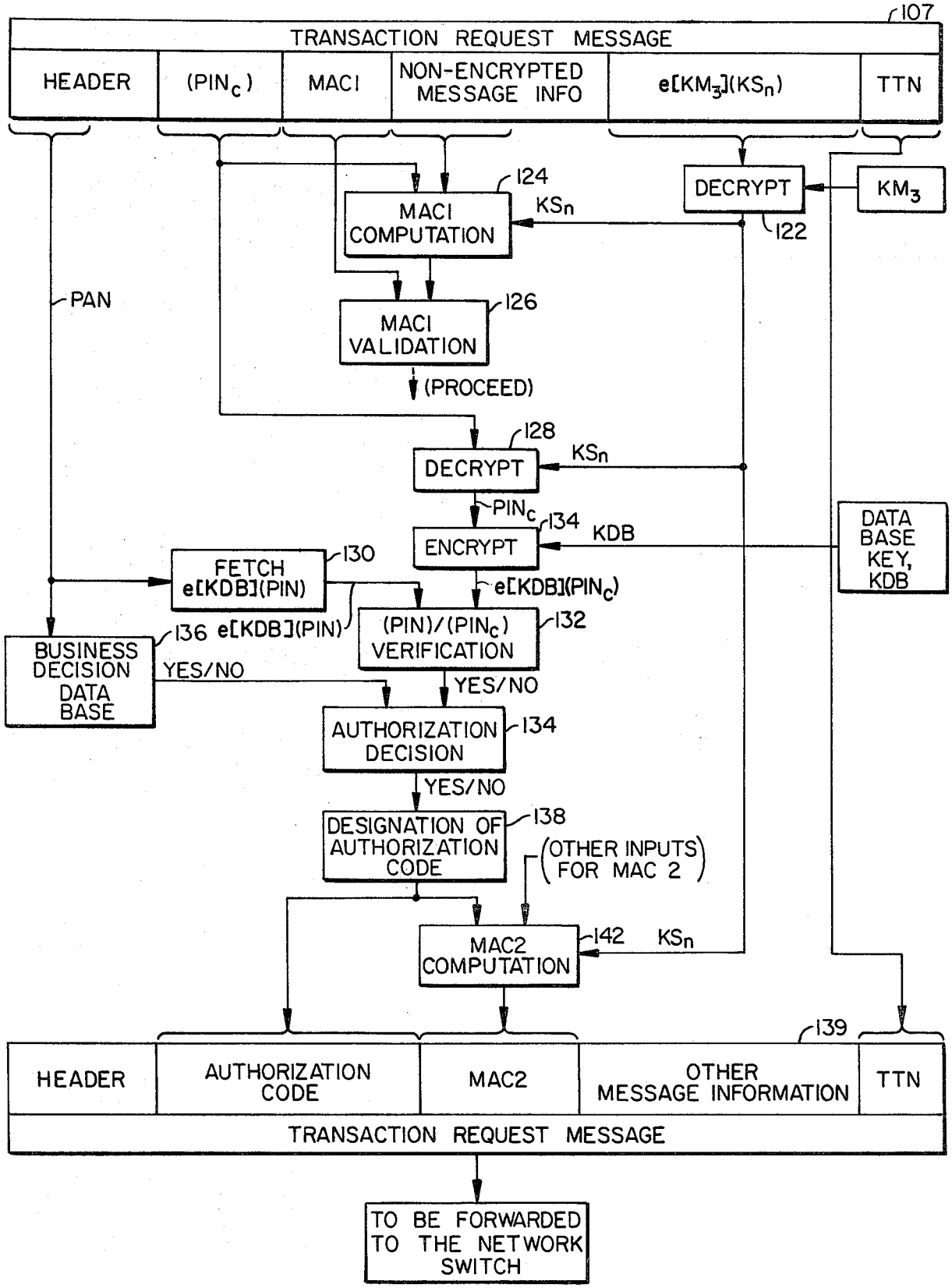
FIG._9.

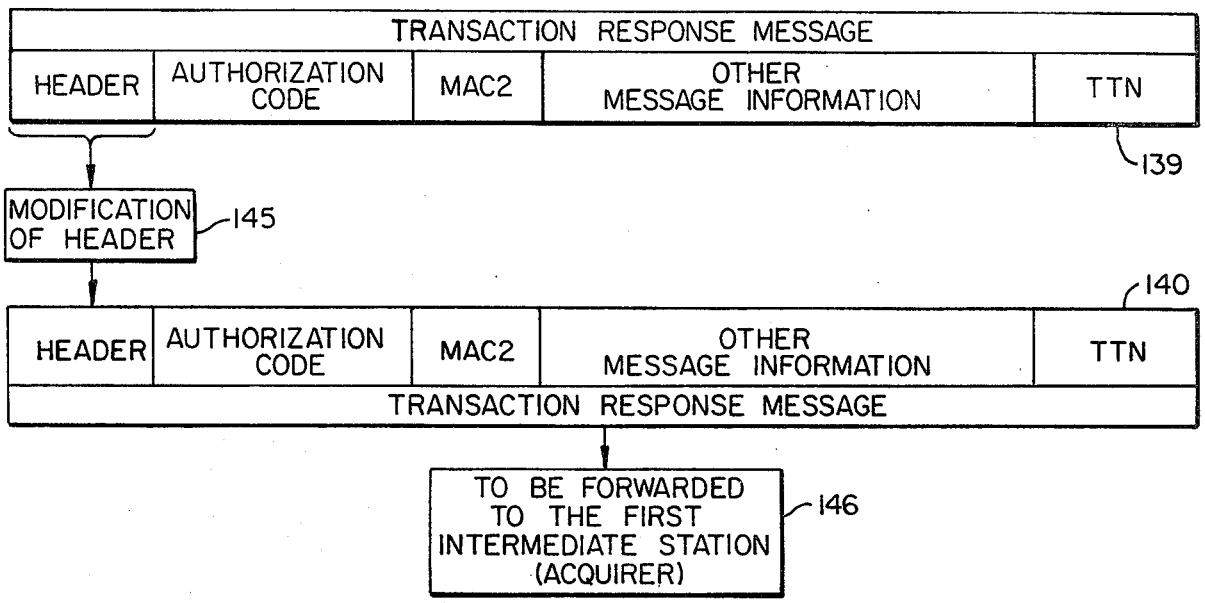
FIG._10.
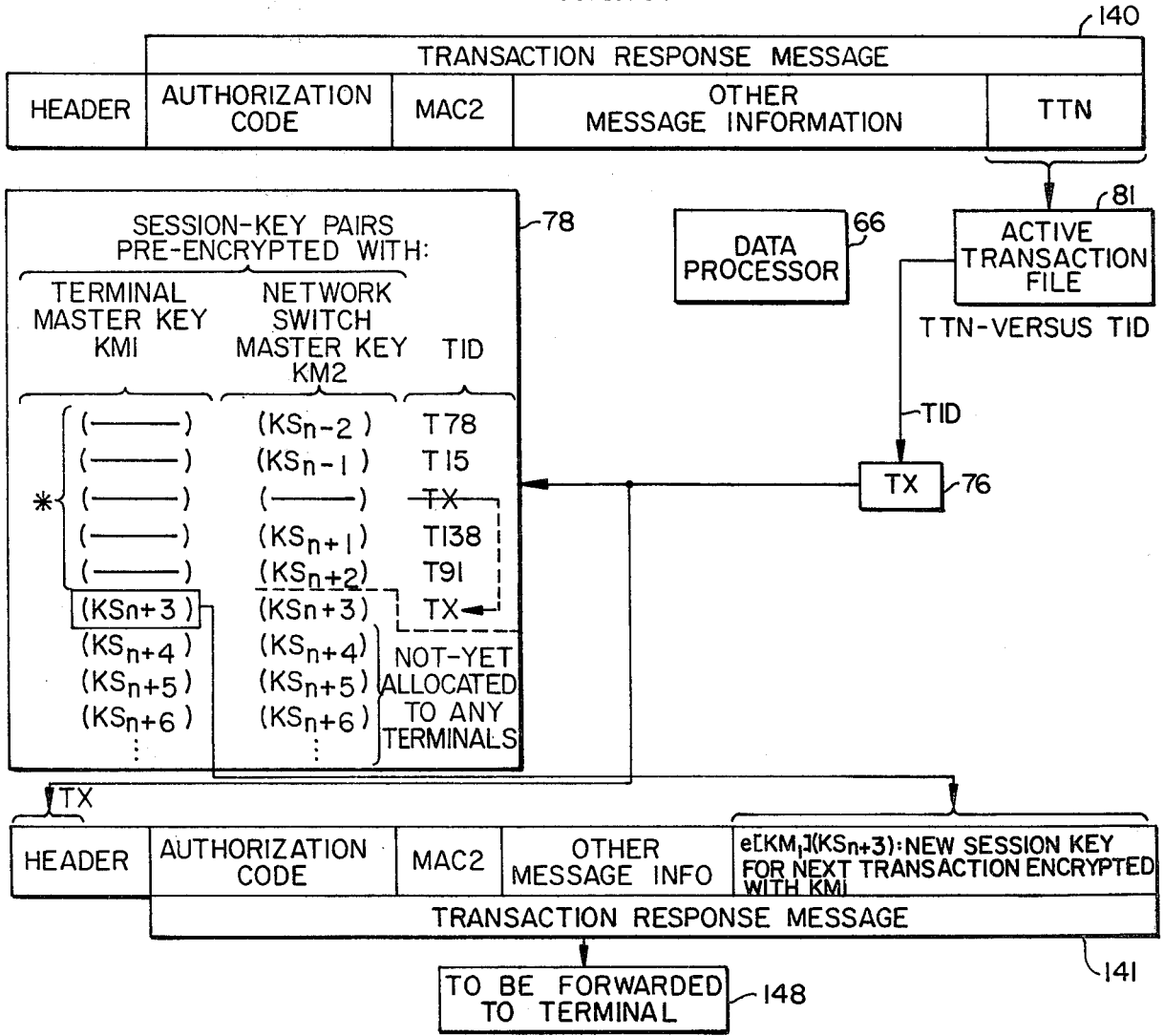
*PREVIOUSLY SENT TO TERMINALS (IN RESPONSE MESSAGES)
FIG._11.

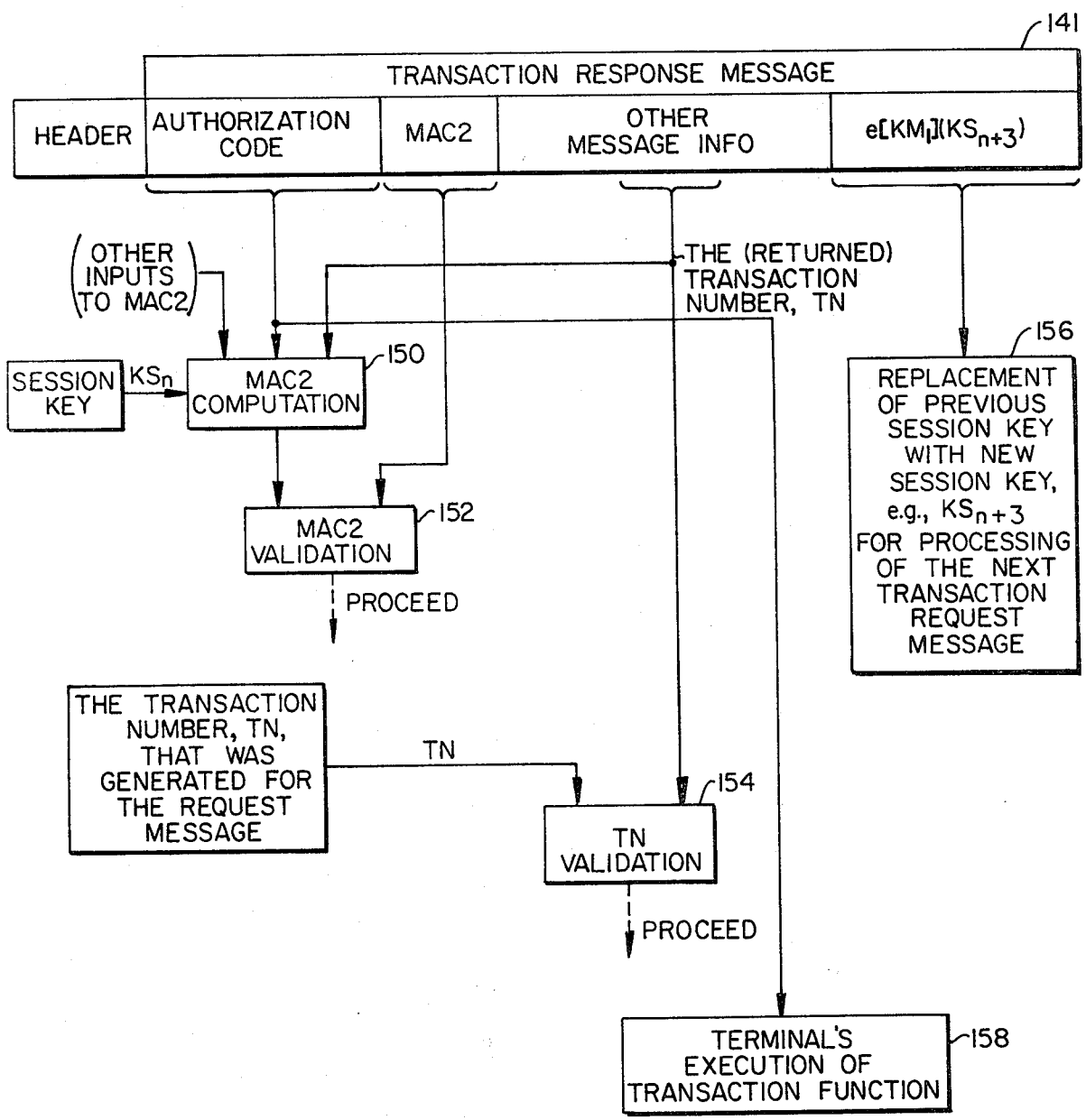
FIG._12.

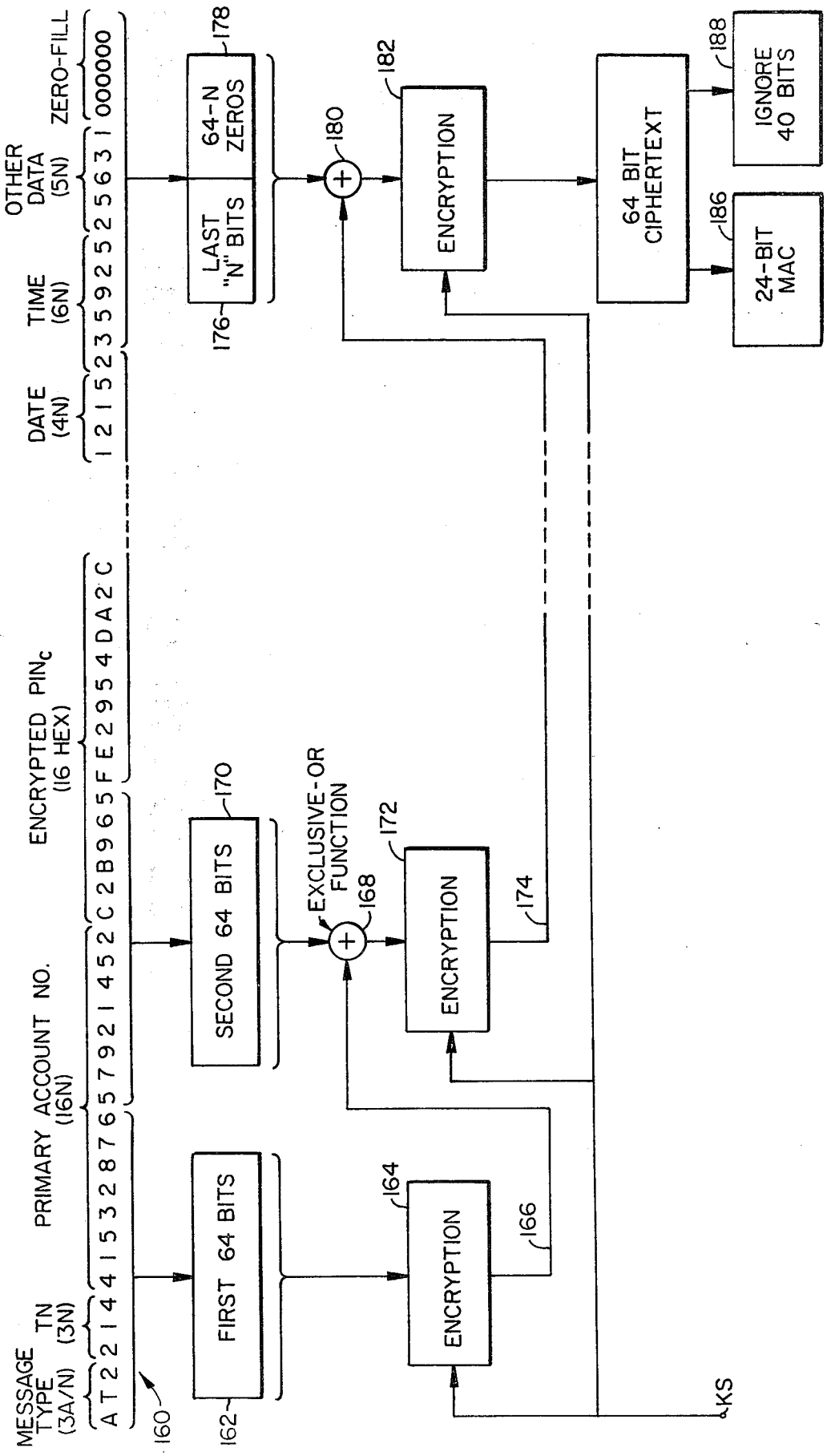
FIG._13.

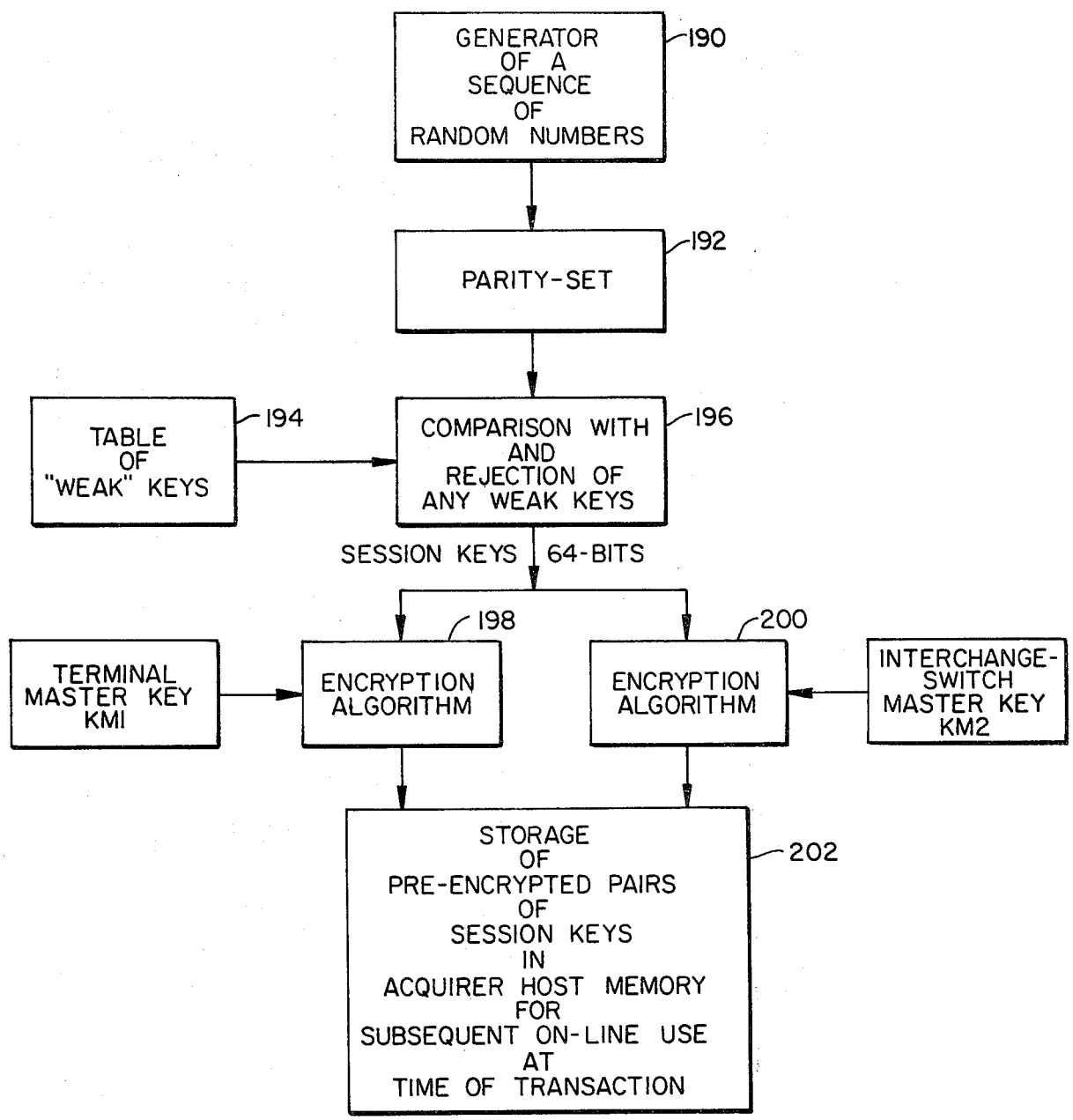
FIG._14.

END-TO-END ENCRYPTION SYSTEM AND METHOD OF OPERATION

BACKGROUND OF THE INVENTION

This invention relates to encryption systems and more particularly to an encryption system for use with automated teller machines (ATM) and cash dispensers (CD). Such machines are typically accessed by means of a card issued by the customer's bank. Within the past twelve years the number of these machines has grown from a few scattered units to a worldwide total of almost 50,000 units. In many areas, groups of institutions have begun to cooperate in the establishment of local, regional, and national shared ATM/CD networks in order to extend the customer convenience represented by electronic fund transfer services beyond the local area.

Thus, a holder of a card issued by one financial institution (the "issuer") can transact business with the issuer through the ATM/CD of a different financial institution (the "acquirer"). This invention applies primarily to this type of transaction where security of one or more message elements must be provided throughout an interchange network communications system, as differentiated from security in a more restricted system not involving many institutions. It is also not limited to financial institutions.

Such networks typically rely on the use of some standardized identifying token which is presented by the user of such services. Such a token would be, for example, a user's plastic card with a magnetizable stripe on the card which is encoded with a particular set of data. It is necessary, however, to provide for the security and privacy of some of the data which is sent by such a user from the ATM/CD through intermediate stations, to the issuer's data processing center. These security provisions must meet needs for economical data transmission, preclude unauthorized access to critical customer related information, and provide a level of privacy that conforms to governmental regulations as they may be formulated. This level of protection must include the entry, transmission, storage, and verification procedures which are used by the various components of the interchange network.

Among the data elements of an ATM/CD message, the most critical requiring some form of protection are:

(a) the cardholder's personal identification number (PIN);

(b) the cardholder's primary account number (PAN);

(c) the cash advance or disbursement amount;

(d) the date and time of the transaction; and (e) a transaction number (TN) which is varied from transaction to transaction.

There are crytographic techniques in existence which provide the means by which data elements such as these can be protected. Such a technique will be discussed in greater detail hereinafter. However, for the present purpose, it is sufficient to know that in the case of the PIN, for example, protection can be achieved by using a cryptographic process called "encryption" by which a PIN of 37 9725" might, for example, be converted temporarily to a disguised value of "B*7@" for transmission from an acquirer through an interchange network to the issuer. In this sense, the word "acquirer" would be the financial institution operating the ATM/CD, while the issuer would be, for example, the destination financial institution providing financial services to the user. At the destination of the message this disguised value would be converted to the original "9725" value by a reverse cryptographic process called "decryption" for further processing to verify the validity of the PIN.

For other critical message elements, such as the amount of the cash advance or disbursement, secrecy may not be required, only protection against alteration. Therefore, instead of encryption, a well-known cryptographic process called "message authentication" is used. This process uses each of the critical data elements in a sequential encryption-like computation that results in a "message authentication code, MAC" to be included, along with the protected data elements, in a message which is transmitted to the destination (intermediate or final).

At the destination, the MAC computation process is repeated on the same data elements. If any one or a combination of these elements has been modified while being transmitted through the interchange network, the resulting MAC would not, with reasonable probability, be identical to the MAC value received, and the message would be rejected because of probable fraud.

For an interchange encryption-decryption process to work, a standard for data protection must be used. In the United States, the American Bankers Association (ABA) Bank Card Standards Committee and the American National Standards Institute (ANSI) have adopted the standard published by the National Bureau of Standards (NBS) of the U.S. Government as the basis for this type of security. A brief description of the NBS concept is presented here for reference. The elements of the concept include an algorithm called the data encryption standard (DES) algorithm and a secret key. The DES is a set of complex mathematical transformations that has been published and is known to everyone, including potential adversaries. The secret key consists of 64-bits of data, known only to the system participants, that make the use of the published algorithm unique and secure.

The DES has the property of "reversibility"; i.e. the DES and the secret key can be used to "encrypt" the input data for protection. They can also be used to "decrypt" or reverse the protected data back to its original form with the same key that was used for the encryption process. A secret 64-bit key establishes security of the encryption system. The input can be any desired 64-bit combination of data. On command, the DES system subjects the input to sixteen complex transformations and presents the 64 resultant "ciphertext" bits at the output register. By ciphertext is meant that the text would be enciphered and not intelligible when reading or computer-based analysis were attempted.

As long as potential adversaries are prevented from learning the key, data for the typical cash advance or disbursement can generally be assumed to be secure. There are no known methods of attacking the system analytically. For a known input/output pair, solving for the key through "exhaustive" sequential testing of all possible (approximately) 72,000,000,000,000,000 values of the key does not appear to be practical within the near future. Use of two or more sequential encryption processes with corresponding different keys would require millions of years of processing by the fastest computers for exhaustive testing, thereby making any such attack completely infeasible.

As described above, a DES key consists of 64 bits which can be interpreted as 16 hexadecimal characters (0-9, and A-F). The security of any system based on DES processing is dependent upon the integrity of key generation and distribution as well as upon the human-related management and operational procedures established for the system. While there are a number of such keys to be used in this type of system, the two types of such keys which have relevance to the present discussion are a data-encryption or session key, and a key-encryption or master key.

A session key is a one-time key only used for the life of one transaction. In some manner, the session key must be sent from the sender to the receiver and the sending of the transaction must convey to the receiver the specific session key which was used for encrypting the transaction. No matter what method for informing the receiver is used, the session key must be protected during the transmittal process by encryption using a master key. Because the session key is used for only one transaction, the potential for compromise is reduced. The key-encryption key, or master key, however, is used for encrypting a session key being transmitted over normal data communication lines or stored in a host data processor. These master keys must be generated, distributed, and loaded under greater security control than that normally used for other types of keys. Because of the high level of security under which these keys are handled, master keys are typically used for longer periods of time that could extend into many months.

In an extensive network with a large plurality of acquirers and a large plurality of issuers, a switch station ("network switch") is used to route and co-ordinate the transaction requests and responses between the various acquirers and issuers. In such systems, it is simply not economically feasible to separately send session keys in special network messages. Also, the time requirements would be prohibitive.

The problems facing the operation of such ATM/CD networks are, then, to provide maximum-feasible security for the transaction data by encryption and decryption processes, and to securely, efficiently, and economically store, retrieve, and transmit the keys necessary to perform these processes.

SUMMARY OF THE INVENTION

The foregoing problems of how to operate an interchange transaction execution system of the type having multiplicities of transaction-source terminals and destination (issuer) data processors which store account information for a plurality of accounts, a plurality of acquirer stations each connected to one or more transaction terminals, and at least one network switch connected between the acquirer stations and the issuer stations, are solved by carrying out the steps to be described hereinafter. Transaction information and a personal identification number, PINc, are received from the user at the transaction terminal. A first session key encrypted with a first master key is retrieved from the terminal's memory and is decrypted with the first master key that is also stored in the memory. In the preferred embodiment, the PINc is encrypted with the first session key $KS_1$ and the encrypted PINc and selected elements of the transaction data are concatenated. The concatenated data are processed with the first session key, according to an arbitrarily-specified procedure to form a first message authentication code, MAC1. A network/interchange request message comprised of the encrypted PINc, the MAC1 and other transaction data are transmitted from the transaction terminal to the acquirer station connected to said terminal.

The acquirer financial institution, retransmits the message along with the same session key, but now encrypted in a second master key, to the network switch. The second master key is known to the network switch as the decoding element to use for that particular acquirer. The network switch, after determining for which issuer the request is intended, retransmits the message to that issuer along with the session key which it translates from second master key encryption to a third master key encryption. The third master key is known to the network switch as the coding element to use for that particular issuer.

At the issuer, the session key is decrypted with the third master key, and the PINc is decrypted with the session key. The MAC1 is recomputed and verified with the received MAC1 using the encrypted PINc, the selected data elements, and the session key. The data base within the issuer's data processor is then accessed for the account specified in the transaction data. The PINc is compared and verified with the corresponding PIN stored in the data base for that account.

At the issuer's data processor, after the PINc and the MAC1 have been verified, and the account balance for the user's PAN has been checked for adequacy, an authorization code is generated to either authorize or deny the requested transaction. A second message authentication code, MAC2, using the session key is computed. The authorization code and the MAC2 are then included in the response message transmitted back to the acquirer through the network switch.

As will be explained further herein, at the acquirer, a new second encrypted session key is added to the response message to be relayed to the original transaction terminal, i.e. the ATM/CD. At the terminal, the MAC2 is recomputed and verified using the first session key. Assuming that the MAC2 is properly verified, the transaction terminal acts on the authorization code to respond to the transaction terminal user.

In the preferred embodiment of the invention the acquirer periodically generates and stores a plurality of session keys in encrypted pairs, the key of each pair being encrypted in a first master key and also in a second master key. With each return message fronm the host data processor, a new, or second session key, encrypted in the first master key, is appended to the return message. At the transaction terminal, the second encrypted session key, at the conclusion of the transaction, replaces the first session key and is stored for use with the next transaction.

For each transaction request message received from the terminal, the acquirer relays a modified message to the network switch. By keeping track of the identifying number of the terminal, the acquirer is also able to recover from storage the second master key encryption of the same session key used to encrypt the PINc at the transaction terminal. It then transmits this latter key, i.e. the session key which is encrypted in the second master key to the network switch, as described above.

One of the significant advantages of an end-to-end encryption system, as opposed to other types of encryption, is that the one time session keys guarantee that at all encrypted data and MACs will be different even for identical transactions. Therefore, data-substitution, PIN substitution, and message-replay types of adversary attacks are precluded. Also, potentially more security is offered against statistical analysis types of attack. A primary advantage of the present end-to-end encryption system is the ease and economy with which these session keys are securely and efficiently distributed. No special key-request or key-transmission messages are required. Another significant advantage is that the system also eliminates the requirements for encryption and re-encryption of critical data, and recomputation of MACs at all intermediate nodes. Therefore, the potential vulnerability to in-house sophisticated attacks is lessened, the message-processing and computer-time requirements are minimized, and the requirement for any on-line security processing at the acquirer installation is eliminated, thereby precluding the need for a special "Security-Module" peripheral at the acquirer.

In other, less desirable embodiments the MAC feature can be omitted, however the level of security for the transaction diminishes accordingly.

In the areas of efficiency and growth, the number of security module accesses required per transaction is only two with this system as opposed to five with a link-encryption system. By security module access is meant access into a secured, hardware/software unit in which encryption and/or decryption processing can be securely executed. Any such access requires significant amounts of programming and processor time. In the subject end-to-end system, approximately only 15 real time encryption and/or decryption cycles are required per transaction, as opposed to approximately 56 for a link-encryption type of system. The relative efficiency of end-to-end systems increases substantially for operations requiring double-key encryption for maximum security.

It is therefore the object of the present invention to provide a method of operating a transaction execution system which allows for the efficient and economical management of system keys and transmission of critical data elements in encrypted form, from one of many transaction terminals to a selected one of many destination data processors, which data are not, at any intermediate station, decrypted to clear text.

It is still another object of the invention to provide a method and apparatus for operating a transaction execution system which allows a network to be easily formed and expanded.

The foregoing and other objectives, features and advantages of the present invention will be more readily understood upon consideration of the following detailed description of certain preferred embodiments of the invention, taken in conjunction with the accompanying drawings.

BRIEF DESCRIPTION OF THE DRAWINGS

FIG. 1 is a block diagram representation of a transaction execution network in accordance with the invention;

FIG. 2 is a block diagram representation of a transaction terminal used in the transaction execution network shown in FIG. 1;

FIG. 3 is an operational block diagram representation of the manner in which a user initiated transaction request is initially processed by the transaction terminal;

FIG. 4 is a block diagram of the acquirer station used in the transaction execution network shown in FIG. 1;

FIG. 5 is an operational block diagram representation of the manner in which a transaction request forwarded by the transaction terminal is received by the acquirer station and is passed on to a network switch station;

FIG. 6 is a block diagram of a network switch station used in the transaction execution network shown in FIG. 1;

FIG. 7 is an operational block diagram representation of the manner in which a transaction request is received by the network switch station from the acquirer station and is forwarded to an issuer station;

FIG. 8 is a block diagram of the issuer station used in the transaction execution network shown in FIG. 1;

FIG. 9 is an operational block diagram representation of the manner in which a transaction request, forwarded by the network switch is received by the issuer, is processed, and a reply message is generated;

FIG. 10 is an operational block diagram representation of the manner in which the network switch relays the reply message to the acquirer station;

FIG. 11 is an operational block diagram representation of the manner in which the issuer's reply message is processed by the acquirer station and is relayed to the original transaction terminal;

FIG. 12 is an operational block diagram representation of the manner in which a transaction reply message from the issuer, relayed by the network switch and the acquirer, is processed by the original transaction terminal;

FIG. 13 is an operational flow chart illustrating the computation of a message authentication code, MAC, according to the invention; and FIG. 14 is an operational block diagram illustrating how the acquirer station depicted in FIG. 4 batch generates session key encryption pairs for subsequent on-line use.

DETAILED DESCRIPTION OF THE CERTAIN PREFERRED EMBODIMENTS OF THE INVENTION

Referring to FIG. 1, the transaction execution system of the invention includes a plurality of acquirer stations 12, each of which has a plurality of separate transaction terminals 10 associated with it. The acquirer stations 12 can be placed in communication with a particular issuer 20, e.g. the transaction terminal user's financial institution, through a network switch station 16.

In operation, a transaction terminal 10, which may be an automatic teller machine (ATM) or cash dispensing (CD) machine, receives transaction information from a user in the form of a personal identification number PINc, an amount, a primary account number PAN, a service code, etc. which can be input by means of a combination of magnetic stripes on a plastic card and a keyboard. The transaction terminal 10 identifies the PAN as having been issued by a potential interchange-type issuer, then retrieves a session key from its electronic memory, which key has been encrypted in a first master key. The session key is decrypted using the first master key, and the personal identification number PINc is encrypted using the session key and the data encryption standard algorithm heretofore discussed. This encryption/decryption process is described in further detail in "Data Encryption Standard, Federal Information Processing Standards Publication, Jan. 15, 1977, FIPS PUB 46" which is incorporated herein by reference. While this encryption/decryption algorithm is preferred, in other embodiments other such algorithms having the same properties could be used.

The transaction terminal 10 then computes a first message authentication code MAC1 on critical data using the session key. Only certain data elements, such as the PINc, need be kept secret by encryption during the transmission of a message from the transaction terminal through the interchange network to the issuer. Other elements, such as the transaction amount, can generally be left in cleartext form for possible processing or logging at intermediate nodes of the network. These cleartext message elements may be protected through inclusion in a message authentication code MAC.

A MAC, in the present invention, is computed at the point of message origination by a process to be described in greater detail hereinafter in reference to FIG. 13.

For the present purpose it is necessary only to note that the inputs to the MAC computation are generated by concatenating all critical data elements for which MAC protection is required. Using the DES with a session key, the concatenated data is input, eight bytes (64-bits) at a time into a sequence of MAC computation cycles. The final DES ciphertext output is truncated to a standard length, in this example three bytes. This value constitutes the MAC, the shortened length being used to minimize the message length without undue sacrifice in security.

The MAC is included in the message for transmission to the destination where it is recomputed with the same session key and input data elements. If the two MAC values are equal, there is virtually no possibility that any of these data elements could have been changed, thereby providing the desired message authentication. In the event that the two values are not equal, the integrity of the message is suspect and the message initiator will be so notified to enable it to initiate pre-specified procedures. Such procedures would typically include regeneration and retransmission of the message. Multiple MAC-check failures lead to some designated form of action, such as refusing to accept any further transactions for that PIN or PAN.

The transaction terminal 10 sends to an associated acquirer station 12 a message comprised of the encrypted PINc, the MAC1 and other transaction data. In some embodiments the transaction terminals are actually operated under a controller tied to the acquirer 12, in which the data is relayed by the controller to the acquirer host processor.

This transaction data would typically include the primary account number PAN, the date, the time, the transaction number, the terminal identification number of the transaction terminal 10, as well as other miscellaneous information.

The data are received at the acquirer station 12 connected to that particular transaction terminal. The station 12 would typically be either in the headquarters or branch of the financial institution which controls the transaction terminal 10. A security module 14 may be associated with the acquirer station 12. A security module would be a secured facility within the station to which unauthorized physical and electronic accesses are precluded as far as is feasible. Within the security module 14, a plurality of encryption pairs of master key encrypted session keys are batch-generated. The session key of each encryption pair is encrypted in a first master key, and is also encrypted in a second master key. The plurality of encrypted pairs of session keys, i.e. $e[KM_1](KS_1, KS_2, KS_3-KS_n)$ and $e[KM_2](KS_1, KS_2, KS_3-KS_n)$, are then output for storage in a memory within the acquirer host processor.

In some embodiments the security module 14 is omitted and the session keys are simply generated, encrypted, and stored by the host processor in off hours under special security precautions.

When the acquirer 12 receives the transmission from the transaction terminal 10, it identifies the transaction terminal that initiated the inquiry which enables it to access from its host memory the second master key encrypted session key, $e[KM_2](KS_n)$ which is paired with the first master key encrypted session key, $e[KM_1](KS_n)$, used by the transaction terminal 10 to encrypt the PINc and to compute the MAC1. The message comprised of the encrypted PINc, the MAC1 and other transaction data is relayed on to a network switch station 16 via data communication lines 15. Appended to that transmission is the recovered, second master key encrypted session key, $e[KM_2](KS_n)$.

The network switch 16 processes transactions between a plurality of acquirers and a plurality of issuers. In some systems, it may also provide communications between two networks, in which case it would interface with the network switch of the second system. Such network switches could be located to be geographically convenient to the acquirers and issuers which make up the network.

The network switch 16 has a security module 18 associated with it. The network switch identifies the sending or acquirer financial institution station 12, locates the security-module encrypted second master key for that bank, determines which issuer 20 the message is intended for from the primary account number, and locates the appropriate security-module encrypted third master key for that issuer. The security module 18 decrypts the master keys, then decrypts the session key with the second master key and re-encrypts it in the third master key. The network switch station 16 retransmits the message including the third master key encrypted session key, $e[KM_3](KS_n)$, to the designated issuer 20 via data communication lines 19.

The issuer 20 includes a host data processor and data base 22. It may also have a security module 24. The issuer 20 receives the encrypted message from the network switch station 16. Within the security module 24, it decrypts the session key using a third master key and also decrypts the PINc using the now decrypted session key. Furthermore, using the session key, the issuer recomputes the MAC1 and verfies it. With the PAN, that is the primary account number, the issuer retrieves the PIN associated with that PAN from the data base 22. This PIN is typically encrypted in a data base key. The user-entered PINc is then encrypted in the data base key also, and the two are compared for verification of the user-entered PINc.

The issuer 20 then specifies an authorization code, such as "authorize" or "deny" (the transaction), and generates a return message. A second message authentication code MAC2 is computed using the session key. This return message including the MAC2 travels back through the network switch 16 and the acquirer 12 to the transaction terminal 10.

The network switch station 16 does nothing but pass on the return message plus the MAC2 to the acquirer 12. The acquirer 12 receives the return message including the MAC2, identifies the initiating transaction terminal 10 and retrieves the next session key, encrypted in the first master key, and appends it to the response message for use in the next transaction by that particular terminal. The entire message is then forwarded to the transaction terminal 10.

The transaction terminal 10 receives the response to the initial request, including the MAC2 and the new, first master key encrypted session key. It recomputes and verifies the MAC2 using the original session key. It also interprets the authorization code for decision on approving or declining the cash advance or disbursement request by the user and takes the appropriate action. It finally replaces the old session key with the new, first master key encrypted session key and stores it in electronic storage.

It should be mentioned at this point that master keys are typically generated under dual control. Each security officer does not know the other officer's input, and a single master key is typically generated by an Exclusive-OR logical process which is well-known to those skilled in the data processing art.

Referring now more particularly to FIGS. 2 and 3 the transaction terminal 10 will be discussed in greater detail, and in particular, how it operates to process a received request.

The transaction terminal 10 can take a variety of forms. Since such terminals are commercially available and are well understood by those skilled in the art, a detailed explanation will not be given. For an example of one such terminal see U.S. Pat. No. 3,956,615.

At the heart of the transaction terminal is a micro- or mini-processor 26 with a number of peripherals. Among these peripherals are a keyboard 28, a display 30, a communications interface module 32, a memory 34, a dispenser 36, a printer 38, a data logging memory unit 40, and a card reader 42. All of these peripherals either supply inputs to the processor 26 or carry out operations under its control.

They keyboard 28 has a plurality of entry switch keys 44 and a plurality of function keys 46. The keys 44 allow a transaction terminal user to enter the user's personal identification number (PINc), the amount, etc. The function keys 46 allow the transaction terminal user to designate the type of function, that is "withdraw from checking", "cancel", "enter", etc.

Display 30 can be in the form of a cathode ray tube display, a light emitting diode display or a liquid crystal display, for example. The display gives prompts to the transaction terminal user and also displays other general information and instructions under the control of the processor 26. The communication interface 32 connects the processor to the acquirer 12 through data communication lines 11. Where a direct link is maintained between the transaction terminal 10 and the acquirer 12, this communication interface would be relatively simple; however, where the terminal is remote from the acquirer, and the connection is made over certain types of normal data communication lines, the interface 32 would include a MODEM.

The memory 34 includes solid state or core memory which stores information supplied from the processor 26 and also supplies data to it. The memory 34 also stores the instructional programs for the processor 26, the encryption keys, and other information required for processing to carry out the functions of the transaction terminal 10. Programmable Read Only Memory (PROM) is typically used for these latter functions.

The dispenser 36 dispenses cash, travellers checks, etc., under the control of the processor 26. The printer 38 prints receipts, audit information, etc., under processor control 26.

The data logging memory unit 40 includes either a tape or a diskette and basically records the transaction information of the transaction terminal 10. This data is used for the bank's record keeping functions.

The card reader 42 detects encoded data on the transaction terminal user's card. These data are typically magnetically or optically encoded, however, in future, more sophisticated embodiments the card reader may interface with so-called "smart cards" which actually incorporate microprocessors of their own.

Referring now more particularly to FIG. 3, the operation of the transaction terminal will be explained. The user's card 48 is entered in the card reader 42 where the primary account number (PAN) and the supporting information such as the expiration date, etc. are read from the card by the card reader 42 at steps 50 and 52 and are entered into the processor 26. From the first several digits of the PAN (or other institution designator), the processor 26 determines whether the transaction to take place is with reference to the acquirer institution, with some other local institution with which the acquirer has a local arrangement, or with an interchange network. The processor 26 first searches its tables in memory 34 to determine whether the PAN corresponds to a first institution, a second institution or a plurality of other institutions with which it has local arrangements and, if it cannot find a match between any of these institutions and the first several digits of the PAN, the processor 26 then concludes that this might possibly be an interchange transaction. It then checks a more restricted set of digits, e.g., the first digit, which could be, in the case of a particular interchange network, a 4. If it gets a match with that 4, regardless of what all of the other digits are, the processor 26 concludes that this is potentially an interchange transaction.

It then goes into that portion of the memory 34 dealing with interchange network data. This data includes a unique encrypted cryptographic key, which corresponds to the session key, described above, encryption type information, PIN encryption format data, and fill characters. From another location in memory 34, the processor 26 withdraws the master key $KM_1$ and, by means of the decryption algorithm 54, it decrypts the encrypted session key to produce the interchange session key $KS_n$. The session key has been designated generally here for the purposes of this discussion and it should be apparent that n=any integer. $KS_n$ is supplied to the key input of an encryption (DES) algorithm 56. It should be noted that, while process steps 54 and 56 are described as algorithms, they are shown in the diagram in blockform to indicate that these procedures may be carried out by means of software programming in the processor 26. In other embodiments, the DES cycles can be implemented on a discrete, integrated circuit chip.

Processor 26 also supplies the encryption type and format specifications 58 to control the formatting of the data 60 which is to be encrypted by the session key $KS_n$ by means of the encryption algorithm 56. Other data entering block 60 are the personal identification number PINc from the keyboard 28, which may typically be four to twelve digits, and the PIN length derived from a length counter 61 which counts the number of PIN digits. In all, the block 60 includes 64 bits of data and it may include fill characters as required, depending on the length of the PIN, and upon the interchange network's specifications.

This 64 bit block of data 60 is then supplied to the DES encryption algorithm 56 where it is encrypted by means of the session key $KS_n$. For the purpose of this discussion, the encrypted data will simply be referred to as the encrypted PIN, $e[KS_n](PINc)$. The $e[KS_n](PINc)$ is supplied to a MAC computation program 62 which will be described in greater detail in reference to FIG. 13. Also supplied to the MAC computation block is the session key $KS_n$, the PAN from step 50, the supporting information from step 52, the transaction number, TN, derived from the processor 26, and other data such as the date, time, etc., of the transaction. The output of the MAC computation block 62 is a message authentication code MAC1 which is typically 24 bits in length.

The processor 26 forms a transaction request message 64 including a header, which includes the terminal identifier, TID, the $e[KS_n](PINc)$, and the MAC1 plus other non-encrypted information. This transaction request message 64 is passed through the communication interface 32 and is transmitted at step 65 to the acquirer 12.

Referring now more particularly to FIGS. 4 and 5, the acquirer station 12 is illustrated as comprising a host processor 66, which could include a full-sized computer, with the usual peripherals of an operator keyboard 68, or other means of data entry, a memory 70, tape machines 72 and an operator display 74. The keyboard 68 allows for system control and for data entry by an operator. The memory 70 stores the pre-encrypted session keys as briefly described above, as well as activity files, general data and instruction programs, etc. The log tapes 72 store record keeping data of the transactions processed by the processor 66. The operator display presents general information to the operator and shows special problem alerts.

In operation, the transaction request message 64 is received over the data transmission lines 11 from the transaction terminal by the host processor 66 of the acquirer station. The terminal identifier, TID, is extracted by the processor from the header of the request message 64 at step 76 and is identified as, for example, terminal TX. This identifier TX is supplied to the host processor 66 which uses it to locate through table 78 in the memory 70, a session key encrypted in the second master key, that is $e[KM_2](KS_n)$.

This encrypted session key was previously generated along with $e[KM_1](KS_n)$, was stored in memory, and was indexed under terminal identifier TX. As will be described further herein, $e[KM_1](KS_n)$ was transmitted to the particular transaction terminal identified as TX with the previous response message.

Other session key half-pairs would be stored in this memory table 78 according to the identifier numbers of the particular transaction terminals. Also stored in memory table 78 are unassigned and encrypted session key pairs which will be assigned to other terminals with the response messages from the various issuers, as will be explained in greater detail hereinafter. The $e[KM_2](KS_n)$ is now appended to the transaction request message 64 along with a transaction trace number, TTN, which is generated by the host processor 66 at step 80. This extended transaction request message 82 is then forwarded to the network switch via the data communication lines 15 at step 83.

The transaction trace number TTN is also supplied, along with the TX, to the active transaction table 81 in memory 70 where the transaction trace number and the terminal identification number are stored in pairs. This allows the data processor 66 to properly identify the transaction versus the terminal when the reply message is received from the issuer and the network switch.

For simplicity of the illustration, the pre-encrypted session key pairs in table 78 of FIG. 5 are shown assignable to any of the terminals controlled by the acquirer station 12. This would require that all such terminals have the same master key $KM_1$. For better security of the total system, the preferred embodiment provides for a different master key for each terminal, and this requires the table 78 be segmented with a separate section being reserved for each terminal. The first master key encrypted session keys in each such section are pre-encrypted with a master key ($KM_1$) unique to that specific terminal. However, all of the paired encryptions (all second master key encrypted session keys) are encrypted with the one second master key associated with the acquirer station. With this sytem, a compromise of the master key for one of the terminals will not compromise the transactions originating from any of the other terminals. For intermediate levels of security, a section of table 78 could be assigned to a subgroup of terminals which would share one of several master keys.

Before continuing on to the description of the network switch and FIGS. 6 and 7, it should be noted that the acquirer station 12 would generally also be an issuer station and, therefore, dual functions are possible with all of the elements described above as will become more apparent with the description of the operation of the issuer.

Referring now more particularly to FIG. 6, the network switch 16 compromises a host data processor 84 together with its peripheral equipment comprised of an operator keyboard 86, a security module 18, a memory 90, log tapes 92, and an operator display 94. The operator keyboard 86, the long tapes 92, and the operator display 94 serve the same types of functions as the corresponding elements at the acquirer station, that is they allow data entry and monitoring as well as record keeping functions to be performed by a resident operator. The memory 90 includes the encrypted master keys of the other network nodes, activity files, general data, programs, etc. For example, it would include the master keys for a plurality of acquirers which can be expected to address the network switch as well as the master keys for a plurality of issuers and possibly for a plurality of switches of other networks with which interchange is conducted. Thus, as mentioned above, each acquirer does not have access to the code keys of other issuers, but has only its own cryptographic key for addressing the network switch.

A major purpose of the security module 18 is for encryption-translation of the session keys, for example from $KM_2$ to $KM_3$, as will be explained in greater detail in reference to FIG. 7.

Referring now more particularly to FIG. 7, the extended transaction request message 82 is received over the data communication line 15 and is broken down into its constituent parts by the processor 84. From the header, the host data processor 84 identifies the acquirer 12 in step 96 and then addresses its memory unit 90 which contains a file of the master keys of the members of the network. These are all encrypted with a special security module master key, KSM.

The security module encrypted master key for the particular acquirer station $e[KSM](KM_2)$ is transferred into the security module portion 18 and is decrypted at step 98 using the security module master key. The e $[KM_2](KS_n)$ taken from the extended transaction request message 82 is fed into the security module 18 and is supplied to a second DES decrypt step 100, with the decryption key being the now decrypted second master key $KM_2$ from the decryption cycle 98. The output of step 100 is the session key $KS_n$. $KS_n$ is supplied from step 100 to still another DES encryption cycle 102 within the security module 18.

From the non-encrypted message information of the extended transaction request message 82, the host processor 84 extracts the PAN and, at step 104, identifies the destination station of the transaction request message, i.e. the particular issuer for the transaction user. This issuer identification number enables the host processor 84 to select from its memory file 90 the appropriate security module encrypted master key for that particular issuer, $e[KSM](KM_3)$. This key is then decrypted at step 106 and the resulting third master key is supplied as the encryption key for the encryption cycle 102. The output of the encryption cycle 102, $e[KM_3](KS_n)$ is now substituted in the extended transaction request message for $e[KM_2](KS_n)$ to formulate a new extended transaction request message 107. The message 107 is forwarded to the destination station, that is the issuer 20 along data communication lines 19 at step 109.

Referring now more particularly to FIG. 8, the issuer 20 comprises a host data processor 108 connected to associated peripheral equipment such as an operator keyboard 110, a memory 112, log tapes 114, an operator display 116, and, in preferable embodiments, a security module 24. Together, the processor 108 and memory 112 make up the processor and data base 22 shown in FIG. 1. The operator keyboard 110, the display 116, and the tapes 114 perform the same types of functions as the corresponding equipment described above in reference to the acquirer station. The memory 112 holds data for the files of each cardholder PIN, encrypted with a data base key, for business decision account information, general data, run programs, activity files, etc. As mentioned above, the issuer station 20 typically would also be an acquirer station as well and, thus, the construction is generally the same as that shown in FIG. 4.

Referring now more particularly to FIG. 9, the operation of the issuer station 20 will be described as it processes a transaction request and generates a response message.

As was noted above, preferable embodiments of an issuer station would include a security module 24 (for all cryptoprocessing). However, since all issuer-related functions pertain to the issuer's own customers (cardholders), any compromise of the issuer system would not adversely involve any other institution's customers—only his own. The issuer may therefore decide that through exercise of proper physical and operational security, he can safely use his host processor for all cryptographic functions. Therefore, in order to minimize complexity of FIG. 9, no specific security-module functional processing area has been designated, as was necessarily done for the network switch in FIG. 7.

The third master key $KM_3$ is supplied from a location in memory as the key to a DES decryption routine 122. The other input to the decryption cycle 122 is the third master key encrypted session key $e[KM_3](KS_n)$. The output from the decryption cycle 122 is the session key $KS_n$ which is supplied as the key to a MAC computation cycle 124. The primary inputs to the MAC computation cycle 124 are the encrypted PINc and the non-encrypted message information, both derived from the extended transaction request message 107. The output of the MAC computation cycle 124 and the MAC1 from the transaction request message 107 are compared with each other at step 126 to generate instruction signals as to whether or not the data processor 108 is to proceed with the remainder of the program.

Assuming that the program is to proceed, the decrypted session key $KS_n$ is supplied as the key to a DES decryption cycle 128 where the encrypted PINc from the transaction request message 107 is decrypted.

The data processor 108, from the PAN contained in the header of message 107, accesses the memory 112 at step 130 to retrieve the PIN, encrypted in a data base key KDB, for that particular PAN. This encrypted PIN is then supplied as one input to a PIN verification decision step 132. The decrypted PINc is encrypted with the data base key KDB at step 134 and is supplied as the other input to the PIN verification step 132. A yes/no decision is then made and is supplied as one input to the authorization decision 134.

The data processor 108 uses the PAN to access the business decision data base portion 136 of the memory 112 to determine whether or not the authorization should be allowed for that PAN. This yes/no decision is also supplied as one input to the authorization decision 134. The net decision output from the step 134 is used to designate the authorization code.

The authorization code, generated at step 138, then becomes one portion of a transaction response message 139. The authorization code is also supplied as one input, along with other selected inputs, to a second message authentication computation MAC2 step 142. The session key $KS_n$ is used as the key to the MAC2 computation step 142. The MAC2 is also a constituent of the response message 139 together with the transaction trace number TTN and a header. This transaction response message 139 is then forwarded to the network switch at step 144.

Referring now more particularly to FIG. 10, it can be seen that the function of the network switch 16 is simply to modify the header of the message 139 at step 145, to create a modified message 140 which is directed to the particular acquirer station at step 146.

Referring now more particularly to FIG. 11, the operation of the acquirer station 12 in processing the transaction response message 140 and forwarding it to the transaction terminal is illustrated. The transaction trace number TTN is used by the processor 66 to look up in the active transaction file 81 the terminal identification TID for the particular transaction terminal which initiated the request. The terminal identifier, for example terminal TX corresponding to that transaction trace number, is then entered into the header of a modified transaction response message 141 to be transmitted to the terminal. The terminal identifier is also entered by the data processor 66 into the solid-state or core memory table 78 and the terminal TX is assigned a pair of previously generated master key encryption pair of a new session key $e[KM_1](KS_{n+3})$ and $e[KM_2](KS_{n+3})$. The second master key encrypted session key of the pair, $e[KM_2](KS_{n+3})$, remains temporarily in the table 78, and the first master key encrypted session key, $e[KM_1](KS_{n+3})$, is appended to the transaction response message 141. This message is then forwarded to the TX transaction terminal 10 at step 148.

Referring now more particularly to FIG. 12, the manner in which the transaction terminal processes the transaction response message 141 is illustrated. From its memory 34 the processor 26 extracts the session key $KS_n$ and uses it as the key for a MAC2 computation 150. The inputs to the MAC2 computation 150 are derived from the transaction response message and include the authorization code and other selected message information. The output of the step 150 is supplied as one input to a MAC2 validation step 152. The other input of step 152 is the MAC2 received in the transaction response message 141. Assuming that the two MAC2 values are the same, the processor is then enabled to proceed with a potentially authorizable transaction.

The next processing step is to verify the transaction number. To do this, the processor 26 compares the transaction number, TN, that was generated for the request message with the returned transaction number, TN, from the transaction response message 141 at transaction number validation step 154. Assuming that the two numbers are the same, the processor 26 is instructed to proceed.

Thereafter the transaction terminal processor 26 replaces the previous session key, $KS_n$, with the new session key, e.g. $KS_{n+3}$, for processing of the next transaction request message. This is done at step 156. The new session key, it will be remembered, was appended to the transaction response message 141.

Finally, the transaction terminal executes the transaction function by acting on the authorization code contained in the transaction response message. This is done in step 158. This involves, for example, dispensing or denying cash, displaying corresponding messages to the customer, the clerk, the teller, etc., and the printing of a user receipt that indicates the acquirer/ATM identity, the date, and the transaction details.

Referring now more particularly to FIG. 13, the steps taken in computing a typical message authentication code, MAC, for a transaction request type of message are illustrated.

MAC computation comprises concatenating certain data 160 such as the message type, the transaction number, the PAN, the encrypted PINc, the date, the time, other data and zero fill numbers to fill out the last of the 64 bit grouping. Some of these data may be alphabetical, some may be numeric, some may be in hexadecimal form. For example, the first three characters of data in the example are the message type and these may typically be in alpha-numeric form. The next three digits are the transaction number and these are usually in numerical form. Next is the PAN which is 16 digits of numeric data followed by the encrypted PINc which is 16 more characters of data in hexadecimal form. The remaining data depend to some extent upon the particular interchange or communications environment.

The first 64 bits 162 of data 160 are input to a DES encryption cycle 164 in which the key is the session key KS. The output of the DES cycle 164 is ciphertext 166. This is Exclusive-ORed by an operator 168 with the second 64 bits of data 170. The output of the Exclusive OR function 168 is supplied as the input to a second DES cycle 172 whose key is again the session key KS. The ciphertext output 174 of DES cycle 172 is then Exclusive-ORed with the next 64 bits which are then encrypted again with the session key KS, and so forth, until the last stage of the MAC computation in which the last N bits 176 plus (64−N) zeros 178 are Exclusive-ORed with the last to be generated ciphertext at step 180 and are encrypted in the last DES cycle 182 with the session key KS. The output of the DES cycle 182 is 64 bits of ciphertext 184. The first 24 bits of this ciphertext 184 comprise a 24 bit MAC 186. The remaining 40 bits 188 are ignored. The reason for selecting the 24 bit MAC is arbitrary and is simply to decrease the communication time required to transmit the MAC without significantly sacrificing the security that it provides.

Referring now more particularly to FIG. 14, some of the off-line batch functions of the acquirer which are required prior to on-line end-to-end encryption are illustrated. Specifically the process by which the acquirer batch generates the session keys is illustrated. It should be understood that these steps are carried out by a temporarily secured host data processor 66 or by a security module 14 of the acquirer. At step 190 a generator of a sequence of random numbers generates a series of 64-bit number combinations. Each 64 bit number passes through a parity-set step 192 which ensures that each byte making up the 64 bits has odd parity.

The results of the parity step 192 are the prospective session keys. At step 196 each of the session keys is compared with a table of weak keys 194 and any such weak keys are rejected. There are several types of weak keys. One such type is known as a self-dual key. With such a key, a stream of data which are encrypted twice by the same key will result not in ciphertext but in the original cleartext. In another type of weak key, known as a dual key, data which are encrypted by the first of the dual keys result in a ciphertext which, when it is thereafter encrypted by the second of the dual keys, will produce the original cleartest instead of ciphertext. In addition, there are certain other types of keys, although not technically weak keys, which are to be rejected, such as a session key made up of all zeros, for example.

Each allowed session key from step 196 is then encrypted both with a terminal master key $KM_1$ at step 198 and with an interchange switch master key $KM_2$ at step 200. The steps 198 and 200 are the DES cycles referred to above. At step 202 the pairs of session keys encrypted with the first and second master keys are stored for subsequent on-line use at the time of transaction in table 78 of the memory 70 of the acquirer.

While there have been described above various arrangements of transaction execution systems in accordance with the invention for the purpose of illustrating the manner in which the invention may be used to advantage, it will be appreciated that the invention is not limited thereto. Accordingly, any modification, variation or equivalent arrangement within the scope of the accompanying claims should be considered to be within the scope of the invention.

What is claimed is:

1. A method of operating a network/interchange transaction execution system of the type comprising a plurality of transaction terminals, a plurality of acquirer stations, each being associated with one or more separate transaction terminals, a plurality of issuer stations, each of which includes a data processor which stores account information for a plurality of accounts, and a network switch which communicatively interconnects the acquirers with the issuers; the method comprising the steps of:
   (a) receiving and identifying network/interchange transaction information and a personal identification number, PINc, from a user at one of said transaction terminals, encrypting the PINc with a first session key, $KS_1$, transmitting to the acquirer station associated with said transaction terminal a network/interchange request message comprised of the encrypted PINc and the transaction data;

(b) at the associated acquirer station, receiving the network/interchange request message from said transaction terminal and retransmitting the network/interchange request message to the network switch along with the session key encrypted in a second master key, $e[KM_2](KS_1)$, (c) at the network switch, receiving the network/interchange request message and the encrypted session key, re-encrypting the session key in a third master key, $e[KM_3](KS_1)$, and retransmitting the network/interchange request message along with the third master key encrypted session key to a particular issuer station specified by data in the network/interchange request message;

(d) at the issuer station, receiving the request message and the encrypted session key, $e[KM_3](KS_1)$, decrypting the session key, decrypting the encrypted PINc, accessing the data base for the account specified in the transaction data, comparing and verifying the PINc with a corresponding PIN stored in the data base for that account, specifying an authorization code in response to the transaction data, and transmitting a reply message, which includes the authorization code, to the acquirer station through the network switch, (e) at the acquirer station, relaying the reply message to said transaction terminal, and, (f) acting on the authorization code to respond to the transaction terminal user.

2. A method of operating a network/interchange transaction execution system as recited in claim 1 further comprising the steps of (a) at said transaction terminal, concatenating the PINc and selected elements of the transaction data, computing a first message authentication code, MAC1, using the concatenated data and the session key, and transmitting the MAC1 as part of the network/interchange request message to the acquirer station to be relayed through the network switch to the issuer station, (b) at said issuer station, recomputing and verifying the MAC1 using the same PINc, the selected data elements, and the decrypted session key, then computing a second message authentication code, MAC2, for the reply message using the session key, $KS_1$, and transmitting the MAC2 to said acquirer station and said transaction terminal through the network switch, and (c) at said transaction terminal, recomputing and verifying the MAC2 using the session key.

3. A method of operating a network/interchange transaction execution system as recited in claims 1 or 2 further comprising the steps of generating, encrypting and storing, at said acquirer station, a plurality of session keys in pairs of encryptions, each key being encrypted once in a first master key and once in a second master key, and appending a different first master key encrypted session key to each reply message sent to said transaction terminal, and storing the other, second master key encrypted session key of the pairs for use with subsequent transactions.

4. A method of operating a network/interchange transaction execution system as recited in claim 3, further comprising the steps of, at said transaction terminal, receiving and storing each new first master key encrypted session key and discarding the previously received such key at the conclusion of the then pending transaction.

5. A method of operating a network/interchange transaction execution system as recited in claim 4 comprising the further steps of, at said acquirer station, receiving the network/interchange request message from the transaction terminal, locating in storage the second master key encrypted session key, corresponding to the session key used by said transaction terminal to encrypt the PINc, and transmitting said second master key encrypted session key to the network switch.

6. A method of operating a network/interchange transaction execution system of the type which includes a plurality of issuer stations, each having a separate data processor which stores account information for a plurality of accounts, a plurality of transaction terminals for input and output processing of user initiated transactions, including network/interchange transactions, a plurality of acquirer stations, each connected to a plurality of separate transaction terminals, and a network switch which communicatively interconnects the acquirer stations with the issuer stations, the method comprising the steps of:

(a) at an acquirer station, batch generating and storing a plurality of session keys, each key being encrypted in a first master key and in a second master key to form session key encryption pairs, (b) at one of the transaction terminals, receiving the transaction data and a personal identification number, PINc, from a user, encrypting the PINc with a session key, $KS_1$, received by said transaction terminal from said acquirer station during the immediately preceding network/interchange transaction, concatenating the PINc and selected elements of the transaction data and computing a first message authentication code, MAC1, using the concatenated data and the session key, and transmitting a network/interchange request message comprised of the encrypted PIN, the MAC1 and the transaction data, to said acquirer station, (c) at said acquirer station, receiving the network/interchange request message from said transaction terminal, locating the corresponding session key, $KS_1$, of the encryption pair which is encrypted in the second master key and relaying it along with the message to the network switch, (d) at the network switch, translating the session key from second master key encryption to encryption in a third master key and relaying it along with the network/interchange request message to a particular issuer as specified by data in the network/interchange request message, (e) at said issuer, receiving the network/interchange request message, decrypting the encrypted session key, $KS_1$, recomputing and verifying the MAC1 using the decrypted session key, $KS_1$, accessing the data base for the account specified by data in the network/interchange request message, translating the session key encrypted PINc into a data base encrypted PINc and comparing and verifying it with a data base encrypted PIN stored in association with the specified account in the data base, then generating an authorization code, recomputing a second message authentication code MAC2 using the session key, and transmitting a response message, including the authorization code and the MAC2 via the network switch to said acquirer station, (f) at said acquirer station, receiving the response message with the authorization code and the MAC2, retrieving the first master key encrypted session key $e[KM_1](KS_2)$ of a new session key encryption pair, and relaying the response message, including the authorization code, the MAC2 and $e[KM_1](KS_2)$ to said transaction terminal, and (g) at said transaction terminal, receiving the response message, including the authorization code, the MAC2 and $e[KM_1](KS_2)$, recomputing and verifying the MAC2 using the previous session key, $KS_1$, acting on the authorization code to carry out the transaction, and replacing the old encrypted session key $e[KM_1](KS_1)$ with the new encrypted session key $e[KM_1](KS_2)$.

7. Improved network/interchange transaction execution apparatus of the type comprising a plurality of issuer stations, each having a host data processor which stores account information for a plurality of accounts, a plurality of transaction terminals, a plurality of acquirer stations, each being connected to at least one, separate transaction terminal, and a network switch station communicatively interconnected between the acquirer stations and the issuer stations, and further comprising:

(a) means at each transaction terminal for receiving the transaction data and a personal identification number, PINc, from a user, for encrypting the PINc with a first session key, $KS_1$, and for transmitting to the acquirer station connected to said transaction terminal, a network/interchange request message comprised of the encrypted PINc and the transaction data, (b) means at said acquirer station for receiving the network/interchange request message from said transaction terminal and for retransmitting the network/interchange request message, including the session key encrypted in a second master key, $e[KM_2](KS_1)$, to the network switch, (c) means at the network switch for retransmitting the network/interchange request message to a particular issuer station as specified in transaction data of the network/interchange request message and for re-encrypting the session key from second master key encryption to encryption in a third master key, $e[KM_3](KS_1)$, (d) means at said issuer station for receiving the network/interchange request message, including the encrypted session key, $e[KM_3](KS_1)$, for decrypting the session key, for decrypting the encrypted PINc, for accessing the data base for the account specified in the transaction data, for comparing and verifying the PINc with the corresponding PIN stored in the data base for that account for specifying the authorization code in response to the transaction data, and for transmitting the authorization code to the network switch for relay to said acquirer station, (e) means at said acquirer station for relaying the authorization code to said transaction terminal, and (f) means at said transaction terminal for acting on the authorization code to respond to the transaction terminal user.

8. Transaction execution apparatus as recited in claim 7 further comprising:

(a) means at said transaction terminal for concatenating the PIN and selected elements of the transaction data, for computing a first message authentication code, MAC1, using the concatenated data and the session key $KS_1$, and for transmitting the MAC1 as part of the network/interchange request message to said acquirer station, (b) means at said issuer station for recomputing and verifying the MAC1 using the same PINc and selected elements, for computing a second message authentication code, MAC2, using the session key $KS_1$, and for transmitting a response message including the MAC2 to said transaction terminal via the network switch and said acquirer station, and (c) means at said transaction terminal, for recomputing and verifying the MAC2 using the session key $KS_1$.

9. Transaction execution apparatus as recited in claims 7 or 8 further comprising means for generating, encrypting and storing, at said acquirer station, a plurality of session keys, each key being encrypted once in a first master key, $KM_1$, and once in a second master key, $KM_2$, to form session key encryption pairs and for appending a different first master key encrypted session key to each response message to the transaction terminal, and for storing the other, second master key encrypted session key of the encryption pair for subsequent use.

10. Transaction execution apparatus as recited in claim 9, further comprising means at said transaction terminal for receiving and storing each new first master key encrypted session key and for discarding the previously received such key at the conclusion of the then pending transaction.

11. Transaction execution apparatus as recited in claim 10 further comprising means at said acquired station for receiving the network/interchange request message from said transaction terminal, for locating in storage the corresponding second master key encrypted session key which is the same session key used to encrypt the PINc at the transaction terminal, and for transmitting the second master key encrypted session key to the network switch.

12. Network/interchange transaction execution apparatus comprising a plurality of issuer stations each of which includes a data processor for storing account information for a plurality of accounts, a plurality of transaction terminals, a plurality of acquirer stations, each being connected to at least one, separate transaction terminal, and a network switch communicatively connected between the acquirer stations and the issuer stations, and further including:

(a) means at the acquirer stations for batch generating, encrypting and storing a plurality of session keys, each session key being encrypted once in a first master key, $KM_1$, and once in a second master key, $KM_2$, (b) means at an originating transaction terminal for receiving and identifying network/interchange transaction data and a personal identification number, PINc, from a user, for encrypting the PINc with a session key, $KS_1$, received by the originating transaction terminal from the acquirer station during the immediately preceding transaction at said transaction terminal, for concatenating the PINc and selected elements of the transaction data, computing a first message authentication code, MAC1, using the concatenated data and $KS_1$ and for transmitting a network/interchange request message comprised of the encrypted PINc, the MAC1 and the transaction data, to the acquirer station connected to said transaction station, (c) means at said acquirer station for receiving the network/interchange request message from the originating transaction terminal, for locating the same session key which is encrypted in the second master key, $e[KM_2](KS_1)$, and for relaying it along with the network/interchange request message to the network switch, (d) means at the network switch for receiving the network/interchange request message and the encrypted session key, re-encrypting the session key in a third master key, $e[KM_3](KS_1)$, and retransmitting the network/interchange request message along with $e[KM_3](KS_1)$ to a particular issuer station specified in the transaction data included in the network/interchange request message, (e) means at said issuer station, for receiving the network/interchange request message, for decrypting the session key, $KS_1$, for recomputing and verifying the MAC1 using the decrypted $KS_1$, for accessing the data base for the account specified in the network/interchange request message, for translating the session key encrypted PINc into a data base encrypted PINc and comparing and verifying it with a data base encrypted PIN stored in association with the specified account in the data base, for thereafter generating an authorization code, for recomputing a second message authentication code, MAC2, using $KS_1$, and for transmitting a response message, including the authorization code and the MAC2 to said acquirer station, (f) means at said acquirer station, for receiving the response message, including the authorization code and the MAC2, for retrieving the first master key encrypted session key $e[KM_1](KS_2)$ of a new pair of session key encryptions, and relaying the response message, including the authorization code, the MAC2 and the $e[KM_1](KS_2)$ to said originating transaction terminal, and, (g) means at said originating transaction terminal for receiving the response message, including the authorization code, the MAC2 and the $e[KM_1](KS_2)$, for recomputing and verifying the MAC2 using the previous session key $KS_1$, for acting on the authorization code to carry out the transaction, and for replacing the old encrypted session key $e[KM_1](KS_1)$ with the new encrypted session key $e[KM_1](KS_2)$.

* * * * *